(12) United States Patent
Sutton et al.

(10) Patent No.: US 11,401,999 B2
(45) Date of Patent: Aug. 2, 2022

(54) DUAL CLUTCH TRANSMISSION AND HYBRIDIZED DRIVE TRAIN HAVING A DUAL CLUTCH TRANSMISSION

(71) Applicant: McLaren Automotive Limited, Surrey (GB)

(72) Inventors: John Henry Sutton, Woking (GB); Michael Kerr, Thatcham (GB)

(73) Assignee: McLaren Automotive Limited, Woking (GB)

( * ) Notice: Subject to any disclaimer, the term of this patent is extended or adjusted under 35 U.S.C. 154(b) by 532 days.

(21) Appl. No.: 16/091,966

(22) PCT Filed: Apr. 6, 2017

(86) PCT No.: PCT/EP2017/058283
§ 371 (c)(1),
(2) Date: Oct. 5, 2018

(87) PCT Pub. No.: WO2017/174741
PCT Pub. Date: Oct. 12, 2017

(65) Prior Publication Data
US 2019/0120327 A1 Apr. 25, 2019

(30) Foreign Application Priority Data
Apr. 8, 2016 (DE) ...................... 20 2016 101 867.6

(51) Int. Cl.
*F16H 3/00* (2006.01)
*B60K 6/387* (2007.10)
(Continued)

(52) U.S. Cl.
CPC ............. *F16H 3/006* (2013.01); *B60K 6/387* (2013.01); *B60K 6/48* (2013.01); *B60K 6/547* (2013.01);
(Continued)

(58) Field of Classification Search
CPC ............. B60K 6/48; B60K 2006/4825; B60K 2006/541; B60K 6/547; B60K 2400/428;
(Continued)

(56) References Cited

U.S. PATENT DOCUMENTS 627,383 A * 6/1899 Birrell ....................... F16H 3/70
475/173
7,021,169 B2 4/2006 Kobayashi
(Continued)

FOREIGN PATENT DOCUMENTS

CN 204 164 278 U 2/2015
DE 10 2008 010 039 A1 10/2008
(Continued)

OTHER PUBLICATIONS

Translation of the Written Opinion from the counterpart PCT Application No. PCT/EP2017/058283, dated Jul. 17, 2017 (6 pages).
(Continued)

*Primary Examiner* — Joseph Brown
(74) *Attorney, Agent, or Firm* — Fish & Richardson P.C.

(57) ABSTRACT

The invention relates to a dual clutch transmission (11, 211, 411, 611), comprising a gear-change transmission (15, 215, 415, 615) for forming eight gear steps having two countershafts (29, 31, 229, 231, 429, 431, 629, 631, 829) and having a common output shaft (33, 233, 433, 633). Said dual clutch transmission is configured in such a way that all gear steps are designed as forward gears. Hereby, a double clutch (13, 213, 413,613) has two clutch packs (17, 19, 219, 417, 419, 617, 619) arranged on a central axis (23, 223, 423, 623) of the double clutch transmission. A drive input shaft (21, 221, 421, 621) of the dual clutch transmission is seated on the central axis (23, 223, 423, 623), on which drive gearwheels (41, 241, 441, 641; 43, 243, 443, 643; 45, 245, 445, 643; 47,
(Continued)

247, 447, 647; 49, 249, 449, 649; 51, 251, 451, 651) of the individual gear steps are seated.

14 Claims, 7 Drawing Sheets

(51) Int. Cl.
*B60K 6/48* (2007.10)
*B60K 6/547* (2007.10)
B60K 6/54 (2007.10)
F16H 3/093 (2006.01)
F16H 57/02 (2012.01)

(52) U.S. Cl.
CPC ............. *B60K 2006/4825* (2013.01); *B60K 2006/541* (2013.01); *B60Y 2400/428* (2013.01); *F16H 2003/008* (2013.01); *F16H 2003/0931* (2013.01); *F16H 2057/02043* (2013.01); *F16H 2200/006* (2013.01); *F16H 2200/0021* (2013.01); *Y02T 10/62* (2013.01)

(58) Field of Classification Search
CPC ....... F16H 2003/0931; F16H 2200/006; F16H 3/006; F16H 2200/0021; B60Y 2400/428
See application file for complete search history.

(56) References Cited

U.S. PATENT DOCUMENTS

| | | | |
|---|---|---|---|
| 7,870,804 B2 | 1/2011 | Bjorck et al. | |
| 8,297,141 B2 | 10/2012 | Cimatti et al. | |
| 9,897,194 B2 | 2/2018 | Barone et al. | |
| 2008/0202265 A1 | 8/2008 | Hendrickson et al. | |
| 2009/0249907 A1 | 10/2009 | Singh et al. | |
| 2010/0132492 A1 | 6/2010 | Holmes | |
| 2010/0179024 A1* | 7/2010 | Holmes | B60K 6/36 477/5 |
| 2012/0174707 A1* | 7/2012 | Ross | F16H 3/006 74/665 D |
| 2012/0272760 A1* | 11/2012 | Mellet | F16H 3/006 74/331 |
| 2013/0133451 A1 | 5/2013 | Schneider et al. | |
| 2013/0337972 A1* | 12/2013 | Lee | B60K 6/547 477/5 |
| 2015/0167785 A1 | 6/2015 | Lee et al. | |
| 2016/0076626 A1* | 3/2016 | Hose | F16H 57/021 74/665 K |
| 2016/0082821 A1* | 3/2016 | Mueller | B60K 6/26 180/65.21 |
| 2016/0341285 A1* | 11/2016 | Gwon | F16H 3/006 |
| 2018/0106330 A1* | 4/2018 | Gwon | F16H 3/006 |
| 2019/0128380 A1 | 5/2019 | Sutton et al. | |

FOREIGN PATENT DOCUMENTS

| | | | | |
|---|---|---|---|---|
| DE | 11 2009 001 348 T5 | 1/2012 | | |
| DE | 102010037451 A1 * | 3/2012 | | F16H 3/093 |
| DE | 10 2011 051 360 A1 | 12/2012 | | |
| DE | 102011088602 A1 * | 6/2013 | | B60K 6/48 |
| DE | 10 2013 111 474 A1 | 4/2015 | | |
| DE | 202014104722 U1 * | 1/2016 | | F16H 3/006 |
| EP | 2428699 | 12/2014 | | |
| EP | 2428699 B1 * | 12/2014 | | F16H 3/006 |
| EP | 3147148 | 3/2017 | | |
| GB | 2 513 607 A | 11/2014 | | |

OTHER PUBLICATIONS

German Search Report, with translation thereof, for corresponding Appl No. 20 2016 101 867.6, dated Dec. 7, 2016.
The International Search Report and Written Opinion from the counterpart PCT Application No. PCT/GB2017/050989, dated Jul. 12, 2017 (12 pages).
The International Search Report from the counterpart PCT Application No. PCT/EP2017/058283, dated Jul. 17, 2017 (2 pages).
European Office Action in European Appln. No. 17717846.4, dated Jul. 2, 2020, 4 pages.
EP Office Action in European Appln. No. 17717846.4, dated Dec. 3, 2020, 5 pages.
GB Search Report in Great Britain Appln. No. GB1818277.9, dated Mar. 29, 2021, 4 pages.

* cited by examiner

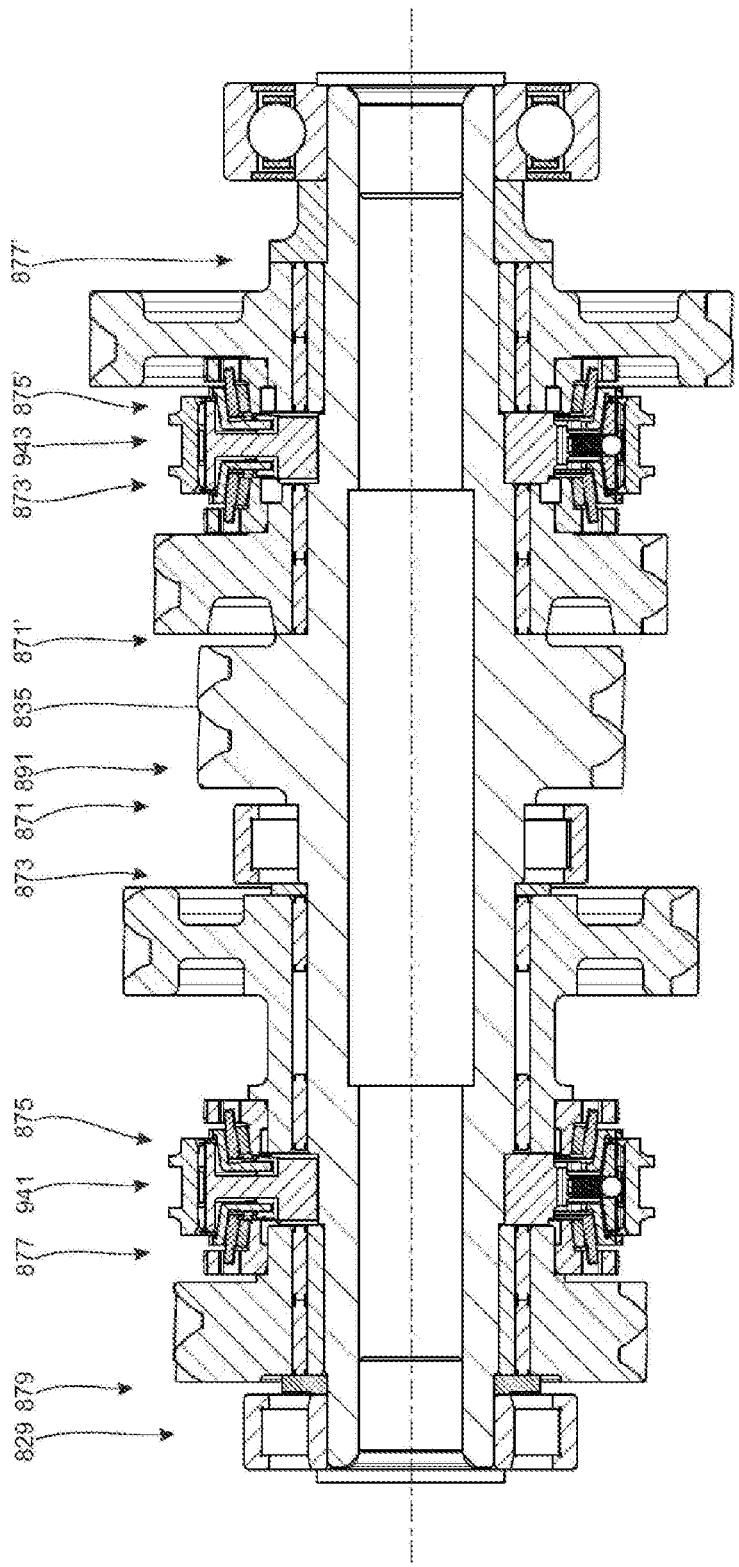

DUAL CLUTCH TRANSMISSION AND HYBRIDIZED DRIVE TRAIN HAVING A DUAL CLUTCH TRANSMISSION

CROSS-REFERENCE TO RELATED APPLICATIONS

This application is a national stage of and claims priority under 35 U.S.C. § 371 to PCT Application No. PCT/EP2017/058283, filed on Apr. 6, 2017, which claims priority to German Application No. DE 20 2016 101 867.6, filed on Apr. 8, 2016. The contents of both of these priority applications are hereby incorporated by reference in their entirety.

The present invention relates to a dual clutch transmission, which as gear-change transmission offers eight gear steps for forwards gears, using two countershafts. To this end, the dual clutch transmission has an output shaft on which a gear translation is guided using one of the two countershafts.

In other words, the present invention concerns a dual clutch transmission according to claim 1.

In addition, the present invention deals with an appropriate drive train with a dual clutch transmission of this sort. The present invention deals thus with a drive train according to claim 15.

PRIOR ART

Dual clutch transmissions have been known for many decades as motor vehicle transmissions, in particular for passenger vehicles.

US 2010/132 492 A1 (Inventor: Alan G. Holmes; filing date: 3 Dec. 2008) describes an 8 gear dual clutch transmission in which all gears are formed as forward gears and which is supposed to be part of a drive train with an internal combustion engine. An electric motor disposed in the housing of the transmission is in one embodiment alterable in its direction of rotation, so that the electric motor is responsible for the generation of a reverse movement. The document deals with the theme of designing a transmission which is axially as compact as possible, and accepts therewith building cantilevered in radial direction. Thus, e.g. two clutch double packs are installed for each of the two present countershafts, via which in each case four gears, of the gears which can be shifted by means of claw clutches, can be shifted up. The transmission stages are—viewed in direction of flow of power—arranged upstream of the clutch packs. Although also in the case of this transmission a power flow interruption-free gear change is theoretically possible, however a transmission of this sort should not allow a fast blending from one gear into the next gear, because of the necessity for the speed synchronisation when shifting. That means, a targeted power-flow-steered shifting appears difficult. An additional aggravating circumstance is that by reason of the speed adjustments which need to be carried out, also the realisation of a comfortable shifting is to be considered difficult. In addition, the arrangement of four clutch packs outside the drive shaft middle of the transmission, and by reason of the interposed transmission stages, should only be usable for small motorised units with low, predictable torques. A further disadvantage of a transmission of this type consists in the low flexibility which it offers an engineer when designing the possible gear steps.

A further transmission, which can also be described as 8 gear transmission, is learned from the document CN 204 164 278 U (Applicant: Geely Automotive Res Inst ZJ; Filing date: 29 Aug. 2014). The reverse rotational direction of the output shaft takes place via a (multiple) winding by the transmission using the gear step of the second gear and requires a further gear step drawing upon the second countershaft. The transmission stepping influenced inter alia by the reverse gear interconnection seems to make it necessary that three coupling sleeve synchronisations can only be occupied on one side. This results in seven coupling sleeve actuators needing to be installed controllably in the transmission. Each sleeve and its actuation requires a minimum width, which is usually set in the region of 20 mm and in addition makes necessary an additional movement path.

Task Definition

In the case of high power drive trains, wherein advantageously such a drive train is designed in the form of a hybridised drive train, engineers must face the problems of accommodating in the present assembly space a transmission which can convert and transmit torques, in particular in an upper three-figure region, nevertheless finding a balanced transmission arrangement and developing a suitable gear stepping for the drive train.

In addition, automobile manufacturers insist on the use of motor vehicle components which can be manufactured as easily as possible, which by reason of their construction or shape have a long life and are in addition easy to install.

For a skilled person it is clear that these demands and wishes with regard to a drive train and its transmission are not equally easy to fulfil with respect to each point.

As a result, there is the need for a transmission which can be installed in a drive train and that finds a sensible compromise between the demands which to some extent contradict one another.

DESCRIPTION OF THE INVENTION

The task according to the invention is solved using a dual clutch transmission according to claim 1, which is installable according to claim 15 in an appropriate drive train. Advantageous further developments can be learned from the dependent claims.

The dual clutch transmission comprises a gear-change transmission which is designed to be able to form eight gear steps. The gear steps are formed in turn by using one of two countershafts and by using an output shaft. The output shaft is a common output shaft onto which the power flow or the moment flow is guided from the countershaft in the case of a gear being selected. All gear steps are formed as forward gears. It can also be said, the transmission itself has no reverse gear.

The dual clutch transmission has a dual clutch. Both clutches of the dual clutch are disposed on a central axis of the dual clutch transmission. Advantageously, the clutches are formed as clutch packs. For example, lamella clutch packs can form at least one of the two clutches. There are two clutches present which together form the dual clutch.

A central axis can be drawn through the transmission. The transmission is designed around this central axis. On a section of this central axis extends a drive input shaft of the dual clutch transmission. On the drive input shaft are disposed drive gearwheels of the individual gear steps.

The transmission excels through further interesting aspects.

The dual clutch transmission, which, furnished with an assembly gearchange transmission, also has a dual clutch, offers eight different gears, depending on selection of a form-fitting connection which can be used as synchronisation. The transmission has eight gear steps. The eight gear steps extend over two countershafts. The moment flow is united on a common output shaft. All gear steps are forward gears, there is no direction reversal at a change between two gear steps.

Each of the two countershafts has at least one fixed wheel. The fixed wheel is located in a middle region of the countershaft. A fixed wheel disposed in a middle region of the countershaft is a fixed wheel for an output. Each fixed wheel meshes as output fixed wheel with an output gearwheel on the output shaft.

The dual clutch transmission has therefore at least two output fixed wheels.

These output fixed wheels are disposed in the region of an axial centre of the transmission. The dual clutch transmission has output fixed wheels in a central area on the countershafts.

It is especially advantageous when the output fixed wheels mesh with the same output gearwheel. In such a case, only one output gearwheel is required for both output fixed wheels.

According to a further reaching aspect, the output shaft can be designed such that the output shaft opens into a spur wheel or into a bevel wheel. At one end of the output shaft is disposed a spur wheel or a bevel wheel. This wheel, the spur wheel or the bevel wheel is the coupling member which leads onto a transmission differential.

The previously described transmission can be part of a drive train of a motor-vehicle. The drive train, in particular of a powerful (more than 500 PS) passenger vehicle is equipped with a combustion engine as a first drive unit. Advantageously, the drive train is a hybridised drive train. There is, therefore, a second drive source. The second drive motor is an electric motor.

The first drive motor, the combustion engine, and the second motor, the electric motor, are in one condition decoupled from one another. The motors can selectively be decoupled from one another. In coupled condition, both drive machines or drive motors can develop a power flow via the same dual clutch.

In a drive train of this sort, a previously described dual clutch transmission can be installed.

Hereinafter, advantageous embodiments and further developments are displayed which considered by themselves, both alone and in combination, can also disclose inventive aspects.

The shaft via which the torque is guided into the transmission is a double shaft, which is preferably coaxially formed.

The dual clutch transmission has in an advantageous further development a plurality of countershafts and the drive input shaft. All shafts are in each case, relatively to their middle regions, disposed in alignment. These are mounted in a middle region of the shaft. An alignment can be drawn through the bearing points of the shafts. All middle bearings lie one behind the other, viewed from one side.

As support for the bearings, in an especially advantageous further development, a bearing plate, which extends in the middle region of the housing, can be used.

The bearings can from one point of view also be considered as separation plane. Advantageously, a separation plane extends through the transmission like a bearing plate. The bearing plate or the separation plane can be described as reference plane in the transmission. The shafts are oriented in a (virtually) right angle to this reference plane.

The shafts are advantageously oriented axially parallel to one another, which also comprises orientations, which possibly comprises a few degrees, such as e.g. 1, 2 or 3 degrees, difference from an angle relationship of 360° between the shafts.

In an advantageous embodiment of the invention, the output fixed wheels are disposed immediately adjacent to a middle bearing point. The output fixed wheels are—one in each case—disposed on their countershafts. Each output fixed wheel has a countershaft. Each countershaft has at least one output fixed wheel. In an especially advantageous embodiment there is therefore a one-to-one allocation.

The countershaft is advantageously a stepped shaft. As central point, a point of the countershaft in the region of the output fixed wheel can be selected. Starting from this point, which belongs to the countershaft section which has the largest diameter, a plurality of steps is incorporated into the countershaft. The countershaft has starting from the central point in the direction to one of its ends a plurality of steps one after another. The number of the steps can be three, four or more steps. Starting from the greatest diameter, the taperings of the countershafts follow in individual sections. The transition from one diameter to the next is created by the step. Starting from the greatest diameter, the countershaft tapers to its two ends. Preferably, each side has three steps, possibly also four or five steps. The taperings thus extend in opposite directions. The countershaft is a shaft extending in mirror image manner in steps.

It is especially advantageous when the countershaft is formed as solid shaft or as hollow shaft with end caps.

Further advantages result for a skilled person from the wording or the sense of the dependent claims.

The dual clutch transmission is a simply structured dual clutch transmission inter alia because it functions with a number of only 8 forward gears. Thus, e.g., an additional shaft can be saved.

By reason of the disposition around a central axis, on which inter alia the clutch packs are placed, a very balanced, with respect to mass and weight, transmission can be achieved.

The freedom of design for the gear progression can in the dual clutch transmission be varied to a large extent in that two drive gearwheels are configured as double meshing gearwheels disposed on the central axis, while four further drive gearwheels, also situated in the region of the central axis, are designed as single meshing gearwheels.

For the creation of the dual clutch transmission as compact, balanced and easily realised dual clutch transmission, an additional contributing factor is that in a middle region of the two countershafts in each case a fixed wheel is present which as output fixed wheel transmits the drive power or the torque onto an output shaft.

In a hybridised drive train, which comprises both a combustion engine and an electric motor as drive machine, a reversal of rotation can be realised using the electric motor. The dual clutch transmission rotates independently from the selected gear, that is independently from the gear selection of the output shaft prior to and after each gear change (e.g. from gear 1 two gear 2; e.g. from gear 5 two gear 4; e.g. from gear 4 to gear 6 etc.) uninterrupted in the same rotational direction. A reversal of rotation takes place as a result of a reversal of rotation of the electric motor.

More complex winding gears through the transmission and/or additional shafts for reversal of rotation are unnecessary. Neither a reverse gear shaft, nor a multiple winding over both countershafts are present in the dual clutch transmission; the transmission can be described as reverse gear shaft free and multiple winding free. Each gear goes over the same number of rotating components.

As a result of the avoidance of multiply extending power flow and torque windings, a transmission has been created which has a high effectiveness or only slight power dissipation. In addition, the transmission also offers the possibility to react more freely or more flexibly to wishes for multiple shiftings.

All listed advantages develop their particular effects in particular in high-power drive trains.

The previously shown combinations and embodiment examples can also be seen in numerous further connections and combinations.

Thus, in one embodiment, on the one side of the countershaft e.g. five steps can be recognised, while the other side only three steps are incorporated.

In another or additionally present embodiment, the one countershaft can have approximately in its middle an output gearwheel, while the other countershaft has an output wheel slightly offset hereto, so that the alignment plane runs between the two output gearwheels.

SHORT DESCRIPTION OF THE FIGURES

The present invention can be still better understood when reference is made to the accompanying figures, which show an exemplary manner especially advantageous design possibilities, without limiting the present invention to these, wherein FIG. 1 shows a first embodiment example of a drive train concept, according to the invention, of a hybridised drive train with dual clutch transmission, FIG. 1A shows the first embodiment example of the drive train concept according to FIG. 1 of a hybridised drive train with alternative gearwheel steppings and therewith with different gear distributions, FIG. 2 shows a second embodiment example of a drive train concept, according to the invention, of a hybridised drive train with dual clutch transmission, FIG. 2A shows the second embodiment example of a drive train concept according to FIG. 2 of a hybridised drive train with alternative gearwheel steppings and therewith with different gear distributions, FIG. 3 shows a third embodiment example of a drive train concept, according to the invention, of a hybridised drive train with dual clutch transmission, FIG. 4 shows a fourth embodiment example of a drive train concept, according to the invention, of a hybridised drive train with dual clutch transmission and FIG. 5 shows a cut out view through a countershaft or side shaft, in particular the upper countershaft according to the representation in FIG. 1 with a plurality of steps.

Figure 1:
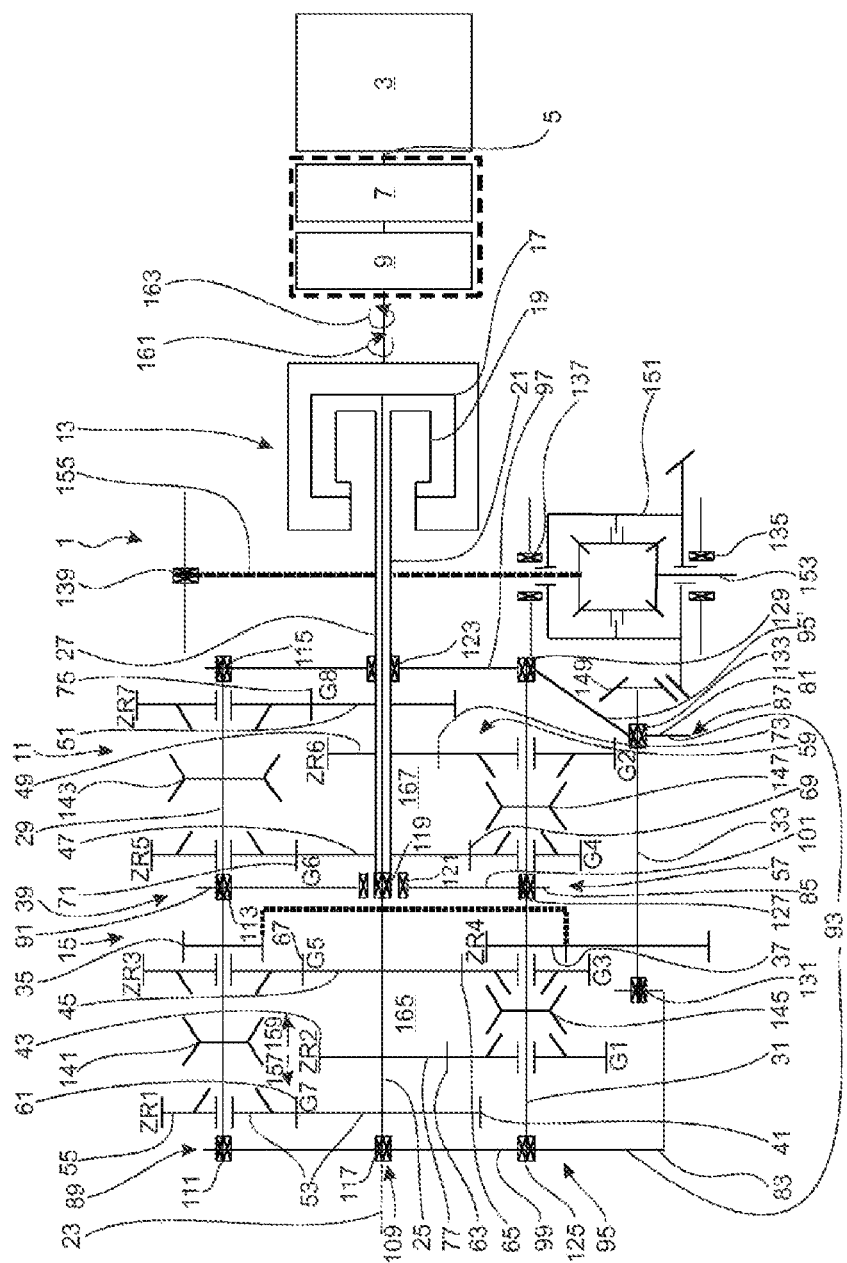
FIG. 1 shows schematically represented by symbols a drive train 1. To the drive train 1 belongs a first drive machine 3, which is a combustion engine. The combustion engine 3 is connected via a crank shaft 5 to a combustion engine clutch 7. Behind the combustion engine clutch 7 (viewed in output direction) is disposed a second drive machine 9, which is an electric motor. In power flow direction downstream is a dual clutch transmission 11. The dual clutch transmission 11 comprises the dual clutch 13 and the gear-change transmission 15. The dual clutch 13 has a first clutch 17 and a second clutch 19. For the actual realisation it is for present purposes convenient to construct the clutch 17 with a complete clutch pack. A clutch pack is also preferably installed instead of the schematically drawn clutch 19. Both clutches 17, 19 lead onto a drive input shaft 21, which lies on an axis 23 which can be described as central axis of the dual clutch transmission 11. The drive input shaft 21 comprises an inner shaft 25 and an outer shaft 27. Further shafts of the dual clutch transmission 11 are a first countershaft 29, a second countershaft 31 and an output shaft 33. The two countershafts 29, 31 can also be described as side shafts. The first countershaft 29 and the second countershaft 31 are situated to the side of the central axis 23. On the countershafts 29, 31 are disposed fixed wheel 35, 37, which can take on the job of output fixed wheels. In each case one fixed wheel 35, 37 is the output fixed wheel for in each case one countershaft 29, 31, via which the output or the output torque is forwarded onto the output shaft 33.

As can be seen in FIG. 1, the fixed wheel 35 is located in the region of an axial centre 39 of the dual clutch transmission 11. The second fixed wheel 37 is disposed in alignment with the first fixed wheel 35. The second fixed wheel 37 is also located centrally or on a position or on a place in the middle region in respect of the longitudinal extension of the countershafts 29, 31.

By means of drive gears such as the drive gears 77 and free wheels such as the free wheel 55, gearwheel steps such as the gearwheel step 53 can be formed. Using a drive wheel 77 and a free wheel 55, the translation steps 59 can be realised in the dual clutch transmission 11.

The dual clutch transmission 11 has seven gearwheel planes ZR1, ZR2, ZR3, ZR4, ZR5, ZR6, ZR7. The majority of the gearwheel planes ZR1, ZR2, ZR3, ZR4, ZR5, ZR6, ZR7 are parts for gear translation steps such as the translation step 59. A gearwheel plane, the fourth gearwheel plane ZR4 is the gearwheel plane which results from the first fixed wheel 35 and the second fixed wheel 37. The two fixed wheels 35, 37 on the countershafts 29, 31 mesh with a drive wheel on the output shaft 33.

On the drive input shaft 21 are disposed drive gearwheels 41, 43, 45, 47, 49, 51. Three drive gearwheels 41, 43, 45 are securely connected with the inner shaft 25. Three drive gearwheels 47, 49, 51 are securely connected with the outer shaft 27. The six drive gearwheels 41, 43, 45, 47, 49, 51 form respectively a part of the gear pairs 61, 63, 65, 67, 69, 71, 73, 75. Two drive gearwheels 45, 47 are doubly used drive gearwheels. The rest of the drive gearwheels 41, 43, 49, 51 are singly used drive gearwheels. Through use of the drive gearwheels 41, 43, 45, 47, 49, 51 in meshing manner with free wheels, such as free wheel 55, there form gearwheel steps such as gearwheel step 53. These gearwheel pairs lead to gear pairs 61, 63, 65, 67, 69, 71, 73, 75.

Depending on selected translation ratio between the drive gearwheels 41, 43, 45, 47, 49, 51 and the respectively assigned free wheel such as free wheel 55, it transpires which gearwheel step 53 is equivalent to which of the gear steps G1, G2, G3, G4, G5, G6, G7, G8.

In the dual clutch transmission 11 can be discovered a separation plane 57.

There is at least one separation plane 57 in the dual clutch transmission 11. The separation plane 57 separates the one, first region 165 of the dual clutch transmission 11 from the other, second region 167 of the dual clutch transmission 11. In the one region 165 are located the drive gearwheels 41, 43, 45, which receive their torque from the inner shaft 25. In the other region 167 are disposed the drive gearwheels 47, 49, 51, which receive their torque from the outer shaft 27.

Several housing walls 81, 83, 85 serve as structural shells 97, 99, 101, in order to offer support points such as the support point 109 for the shafts, such as the drive input shaft 21, the countershafts 29, 31 and the output shaft 33. Through the housing walls 81, 83, 85 are formed regions 87, 89, 91 with respect to the shafts 21, 29, 31, 33. The housing walls 81, 83, 85 are part of the transmission housing 93. The transmission housing 93 has an axial extension, through which the extremities 95, 95' are formed. Support points such as the support point 109 are usable as bearings 111, 113, 115, 117, 119, 121, 123, 125, 127, 129, 131, 133. The drive train 1 has further bearings 135, 137, 139. The further bearings 135, 137, 139 are e.g. to be found on the wheel drive shafts 153, 155.

By reason of the clever disposition of the gearwheel planes ZR1, ZR2, ZR3, ZR4, ZR5, ZR6, ZR7, with only four synchronisations 141, 143, 145, 147 an 8 gear dual clutch transmission 11 can be realised, which has therewith eight gear steps G1, G2, G3, G4, G5, G6, G7, G8. Each of the gear steps G1, G2, G3, G4, G5, G6, G7, G8 maintains the rotational direction 161 between drive input shaft 21 and output shaft 33.

The output shaft 33 is closed on one side with a bevel gear 149. The bevel gear 149 leads onto the transmission differential 151. At the transmission differential 151 are connected the wheel drive shafts 153, 155.

Each of the synchronisations 141, 143, 145, 147 has two movement directions 157, 159, through which the respective free wheel such as the free wheel 55 can be fixed. Through the fixing of the respective free wheel, such as the free wheel 55, forms the corresponding selected gear translation of the gear steps G1, G2, G3, G4, G5, G6, G7, G8.

The dual clutch transmission 11 is designed such that it can be rotated on the input side, i.e. via the drive input shaft 21 in two rotational directions 161, 163.

In one embodiment, the combustion engine can be designed such that it can only provide a first rotational direction 161 at its bevel shaft 5. The electric motor 9 can on the output side perform two rotational directions 161, 163. If a reverse drive movement is realised, the combustion engine is decoupled via the combustion engine clutch 7 from the drive train 1 and the second drive machine 9, the electric motor, turns the dual clutch transmission 11 in the opposite direction. Depending on which gear is selected by reason of the selected synchronisation 141, 143, 145, 147 is possible with eight different translations to move the motor vehicle (not shown), in which the drive train 1 is installed, in reverse drive. In such a situation it seems expedient to limit the reverse drive speed.

If a high power electric motor 9 is used, it is even possible that the motor containing the drive train 1, thanks to the dual clutch transmission 11 being designed to be independent of rotation direction, can be moved with the same reverse speed as the maximum forwards speed, which is attainable through movement of the electric motor 9. Both in forwards rotational direction and in reverse rotational direction, the respective highest gear, the eighth gear (eighth gear step G8) can be selected.

Figure 1A:
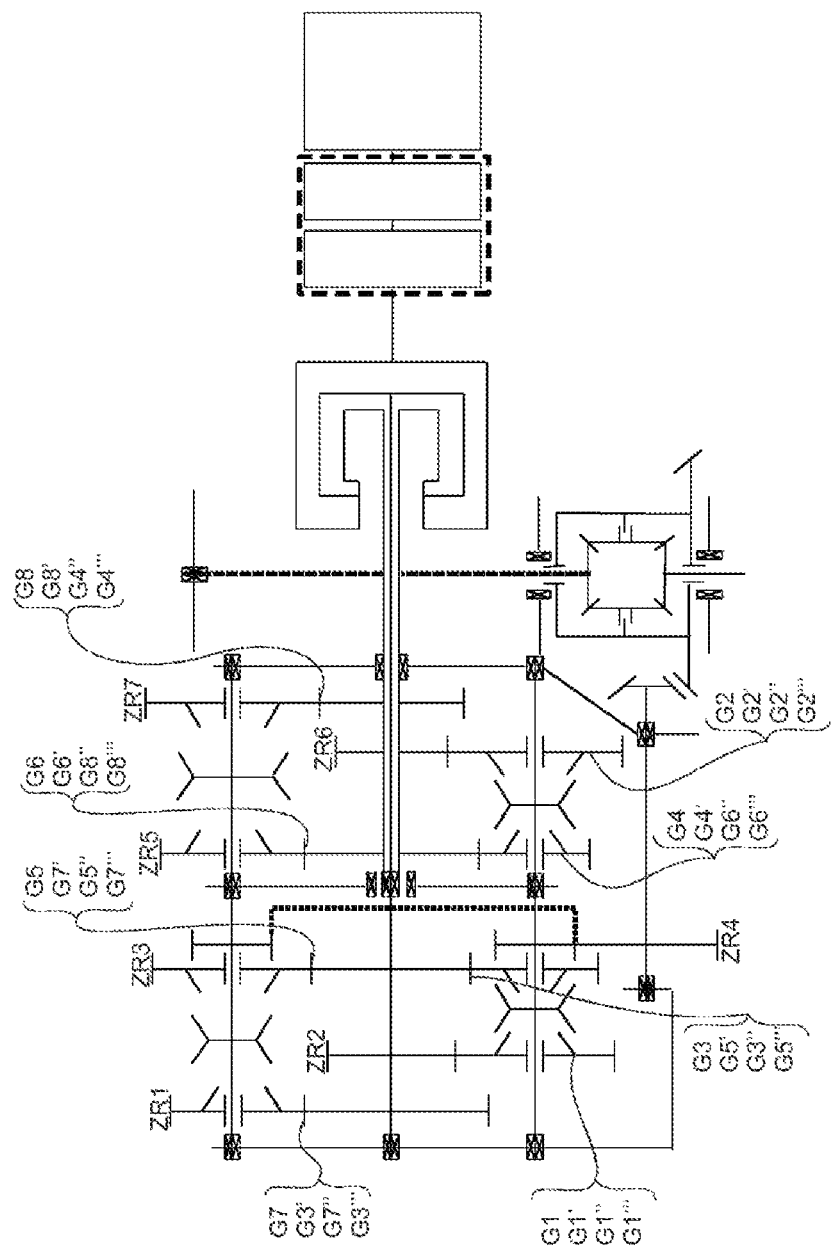

In the representation of the embodiment example according to FIG. 1 shown in FIG. 1A, alternative gear steps are represented in comparison with the gear steps of the gears G1, G2, G3, G4, G5, G6, G7, G8 according to FIG. 1.

The gearwheel steps and the gearwheel planes ZR1, ZR2, ZR3, ZR4, ZR5, ZR6, ZR7 can be numbered in sequence or order of appearance of their disposition. The first gearwheel plane ZR1 can be disposed at the side which is facing as much as possible away from the dual clutch 13, that is at the side facing away from the dual clutch. The numbering of the gearwheel planes ZR1, ZR2, ZR3, ZR4, ZR5, ZR6, ZR7 starts at the end of the double shaft, the drive input shaft 21, which does not open into the dual clutch 13.

As can be seen in FIG. 1, on the first gearwheel plane ZR1 can be guided the seventh gear step G7, that is the seventh gear. On the second gearwheel step or gearwheel plane ZR2, the first gear step G1, that is the first gear, can be placed. On the gearwheel plane ZR3 can be disposed two gears. Both the fifth gear, that is the fifth gear step G5 and the third gear, that is the third gear step G3 can lie on the third gearwheel plane ZR3. The first three gearwheel planes ZR1, ZR2, ZR3 are gearwheel planes ZR1, ZR2, ZR3, which are in connection with the inner shaft 25 of the drive input shaft 21. The three further gearwheel planes ZR5, ZR6, ZR7 are in a driveable connection with the outer shaft 27 of the drive input shaft 21. A further gearwheel plane ZR4 is formed by gearwheels of the countershafts 29, 31.

The gearwheel plane ZR5, which, although being in connection with the outer shaft 27, is however located furthest away from the dual clutch 13 in the transmission 11, can be used as gearwheel plane ZR5 for the fourth gear step G4 and the sixth gear step G6. In the gearwheel plane Z5 takes place in the same way a dual use of the drive gearwheel 47. Each region 165, 167 of the transmission 11 has a drive gearwheel 45, 47 with a gearwheel dual use.

On the next gearwheel plane ZR6, the middle gearwheel plane ZR6 in the second region 167 of the transmission 11, has the second gear step G2. The eighth gear step G8 is directly adjacent to the dual clutch 13.

In FIG. 1A are represented further possible distributions on the gearwheel planes ZR1, ZR2, ZR3, ZR4, ZR5, ZR6, ZR7. In the order of the gearwheel planes ZR1, ZR2, ZR3, ZR4, ZR5, ZR6, ZR7, during the—known already from above—dual use of two drive gearwheels 45, 47 the gear steps can be disposed in the order G3' (third gear), G1' (first gear), G7' (seventh gear), G5' (fifth gear), G6' (sixth gear), G4' (fourth gear), G2' (second gear) and G8' (eighth gear).

As can be learned from FIG. 1A, in an alternative disposition of the gear steps G1", G2", G3", G4", G5", G6", G7" and G8", the gears G7", G1", G5", G3", G8", G6", G2" and G4" can be distributed on the gearwheel planes ZR1, ZR2, ZR3, ZR4, ZR5, ZR6, ZR7.

A further possibility for the distribution of the gear steps consists in the order G3", G1", G7", G5", G8", G6", G2", G4".

Figure 2:
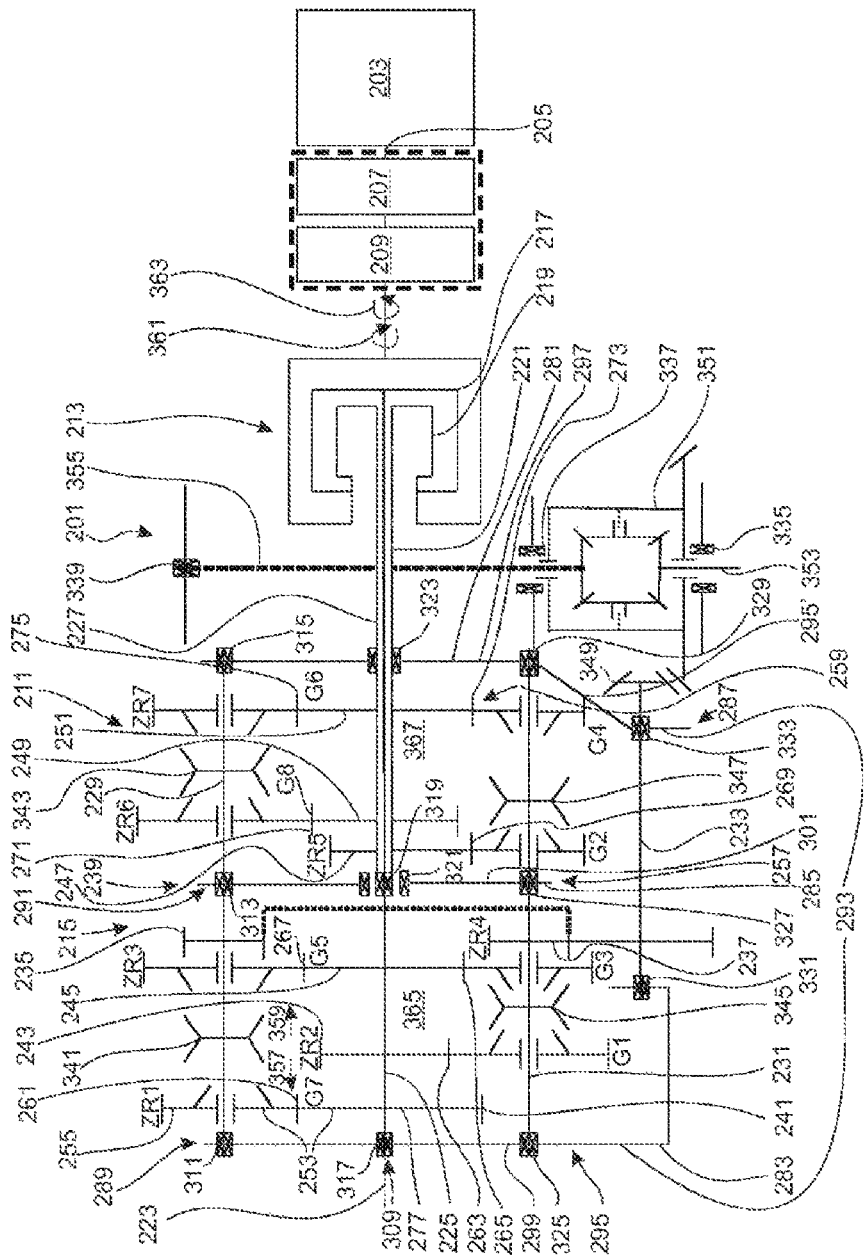

FIG. 2 shows a drive train 201 of the same sort as that in FIG. 1.

Figure 2A:
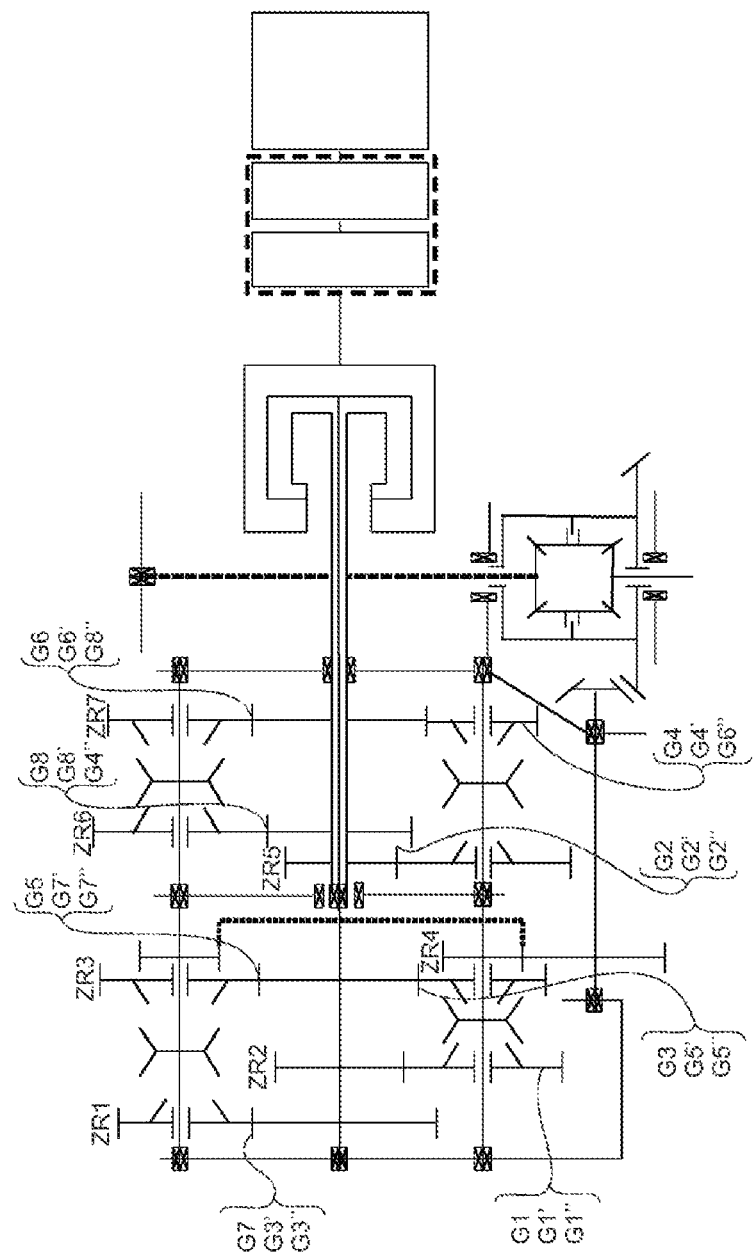
Figure 3:
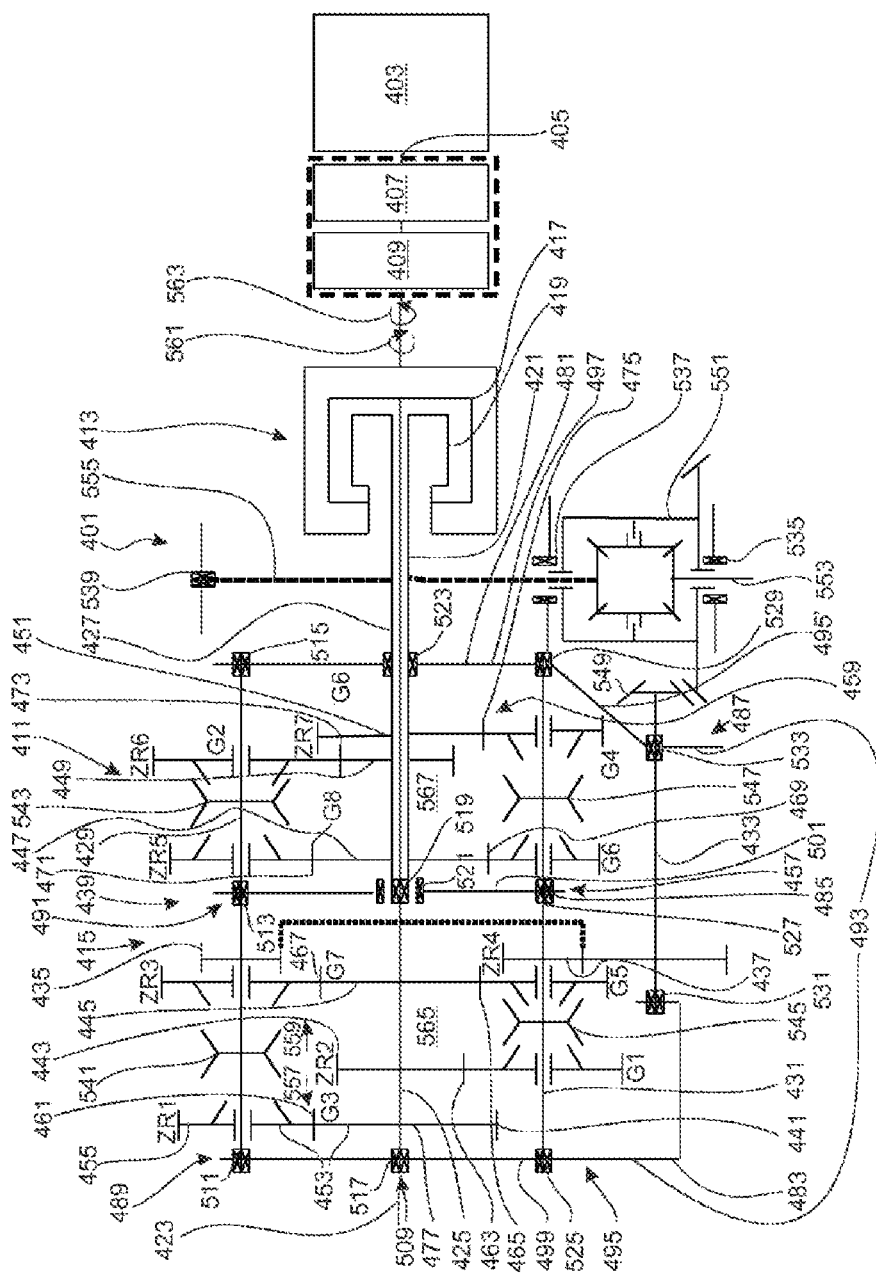
Figure 4:
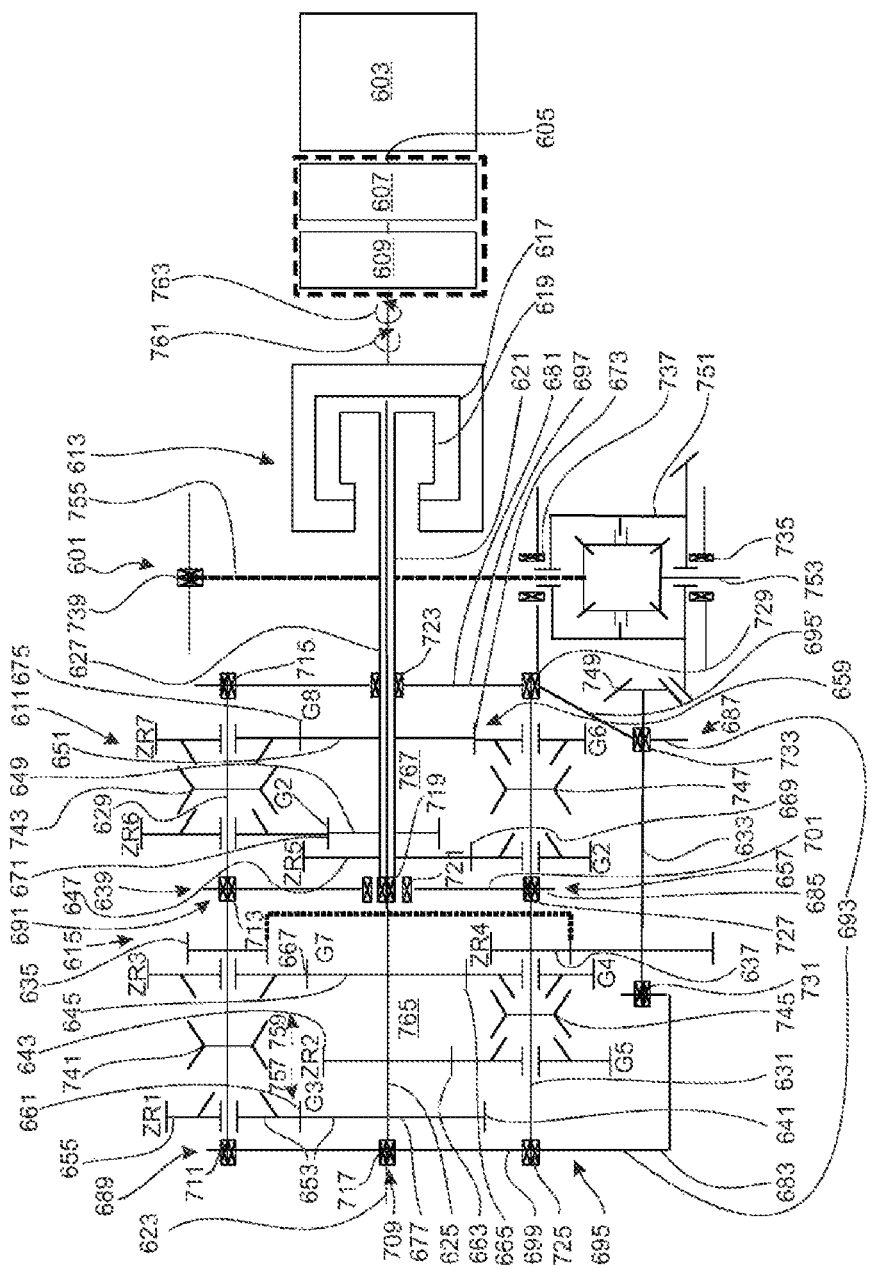

In FIGS. 2, 3 and 4, similar or identical parts and components are labelled with reference signs increased in each case by 200 in comparison with FIG. 1. For this reason, for reasons of explanation, the respective equivalent component or element can be consulted from the figure description respecting FIGS. 1 and 1A when studying the FIGS. 2, 2A, 3 and 4. The sense of the figure description of FIGS. 1 and 1A can be transferred onto FIGS. 2, 2A, 3 and 4.

As can be seen from FIG. 2 regarding the drive train 201, the gearwheel planes ZR1, ZR2, ZR3, ZR4, ZR5, ZR6, ZR7 can be occupied with the gear steps G1, G2, G3, G4, G5, G6, G7, G8. To this end, the gearwheel plane ZR1 serves for the gear step G7 (seventh gear). On the gearwheel plane ZR2 lies the gear step G1 (first gear). On the gearwheel plane ZR3 lie the gear steps G5 (fifth gear) and G3 (third gear). On the gearwheel plane ZR5 lies the gear step G2 (second gear). On the gearwheel plane ZR6 lies the gear step G8 (eighth gear step). On the gearwheel plane ZR7 lies the gear step G6 (sixth gear) and at the same time the gear step G4 (fourth gear step), i.e. also in the sense of a dual use.

FIG. 2A shows alternative distributions of the gear steps on a gear layout according to FIG. 2. From the first gearwheel step ZR1 until the seventh gearwheel step ZR7, the gear step distribution can e.g. look as follows: ZR1—G3', ZR2—G1', ZR3—G7' and G5' (drive gearwheel dual use), ZR5—G2', ZR6—G8' and ZR7—G6' and G4'.

FIG. 3 shows a drive train 401 of the same sort (in comparison with FIG. 1 and FIG. 2). From the side furthest away from the dual clutch 433, i.e. the nearest region to the second housing wall 483 with its gearwheel plane ZR1 has the third gear step G3. There follow the first gear step G1, the seventh gear step G7, the fifth gear step G5, the eighth gear step G8, the sixth gear step G6, the second gear step G2, and the fourth gear step G4.

FIG. 4 shows a drive train 601 of the same sort (in comparison with FIG. 1, FIG. 2 and FIG. 3). The gear step order can be given with G3, G1, G7, G5, G2, G4, G8 and G6.

FIG. 5 shows a first countershaft 829, which is a hollow shaft, and shows a constructional example for the first countershaft 29 (see FIG. 1) of the previous embodiment forms. On the shaft 829 in a middle region 891, which is also known as third region 91, 291, 491 of a countershaft 29, 229, 429, is an output fixed wheel 835. The hollow shaft type countershaft 829 has a largest diameter in the middle region 891. From this middle region in both directions to the extremities of the countershaft 829, steps are incorporated, the position of which is determined by the breadth of the components on the countershaft 829. Thus, the synchronisations 941, 943 determine the breadth between third step 875 and fourth step 877 on the one side and the breadth between the second step 873' and third step 875' on the other side. The one side of the countershaft 829 has five steps 871, 873, 875, 877 and 879. The other side of the countershaft 829 has four steps 871', 873', 875' and 877'.

In FIG. 5, constructional norm references are used, so that an engineer can comprehend the teaching or the concrete implementation with respect to the countershaft 29, 229, 429, 629 from FIGS. 1, 1A, 2, 2A, 3 and 4 using the construction of the countershaft 829 of FIG. 5.

A shaft, such as the countershaft 829 according to FIG. 5, can be realised with shaft steppings of 50 mm, 48 mm, 42 mm and (optionally) 38 mm on one side. Although two full synchronisations 941, 943 are present, a (comparatively) stable countershaft 829 can be created, which nevertheless starts only at a first diameter of e.g. 50 mm. In diameter of 50 mm is an acceptable diameter.

As seen in FIGS. 1, 2, 3 and 4, the middle disposition of the output fixed wheel 835 leads to the possibility of the differential 151, 351, 551, 751, at least partially, entering into the installation space of the dual clutch transmission 11, 211, 411, 611. This is a further contribution to the creation of a compact drive train 1, 201, 401, 601.

Owing to the disposition of the output fixed wheel 835 in the middle region 891, that is owing to a middle diversion, the free wheels, such as the free wheel 55 (see FIG. 1), the free wheel 255 (see FIG. 2), the free wheel 455 (see FIG. 3) and the free wheel 655 (see FIG. 4) can each be slid on from the—for them—nearer end of the countershaft 829 (with respect to their seat position).

The arrangement possibilities shown in the individual figures can also be connected together in any form.

Thus, it is e.g. possible to place in the embodiment variant according to FIG. 2 also gear step distributions according to FIG. 1 or according to FIG. 1A. The first countershaft 829 can e.g. with respect to its (shaft) steppings be implemented identically, at least in similar manner as second countershaft 31, 231, 431, 631.

List of Reference signs

| Reference sign | Meaning |
| --- | --- |
| 1, 201, 401, 601 | drive train |
| 3, 203, 403, 603 | drive machine, in particular combustion engine or internal combustion engine as first drive machine |
| 5, 205, 405, 605 | crank shaft of the internal combustion engine |
| 7, 207, 407, 607 | combustion engine clutch, in particular decoupler, preferably as third clutch of the drive train |
| 9, 209, 409, 609 | drive machine, in particular electric motor as a second drive machine |
| 11, 211, 411, 611 | dual clutch transmission |
| 13, 213, 413, 613 | dual clutch, in particular region of the dual clutch transmission with the dual clutch |
| 15, 215, 415, 615 | gear-change transmission, in particular region of the dual clutch transmission with wheelsets |
| 17, 217, 417, 617 | first clutch, in particular realised as first clutch pack |
| 19, 219, 419, 619 | second clutch, in particular realised as second clutch pack |
| 21, 221, 421, 621 | drive input shaft, in particular as double shaft |
| 23, 223, 423, 623 | axis |
| 25, 225, 425, 625 | inner shaft, in particular the drive input double shaft |
| 27, 227, 427, 627 | outer shaft, in particular the drive input double shaft |
| 29, 229, 429, 629, 829 | first countershaft or side shaft |
| 31, 231, 431, 631 | second countershaft or side shaft |
| 33, 233, 433, 633 | output shaft |
| 35, 235, 435, 635, 835 | first fixed wheel, in particular as output fixed wheel |
| 37, 237, 437, 637 | second fixed wheel, in particular as output fixed wheel |
| 39, 239, 439, 639 | axial centre |
| 41, 241, 441, 641 | first drive gearwheel |
| 43, 243, 443, 643 | second drive gearwheel |
| 45, 245, 445, 645 | third drive gearwheel |
| 47, 247, 447, 647 | fourth drive gearwheel |
| 49, 249, 449, 649 | fifth drive gearwheel |
| 51, 251, 451, 651 | sixth drive gearwheel |
| 53, 253, 453, 653 | gearwheel step |
| 55, 255, 455, 655 | free wheel |
| 57, 257, 457, 657 | separation plane |
| 59, 259, 459, 659 | translation step |
| 61, 261, 461, 661 | first gear pair |
| 63, 263, 463, 663 | second gear pair |
| 65, 265, 465, 665 | third gear pair |
| 67, 267, 467, 667 | fourth gear pair |
| 69, 269, 469, 669 | fifth gear pair |
| 71, 271, 471, 671 | sixth gear pair |
| 73, 273, 473, 673 | seventh gear pair |
| 75, 275, 475, 675 | eighth gear pair |
| 77, 277, 477, 677 | drive wheel |
| 81, 281, 481, 681 | first housing wall |
| 83, 283, 483, 683 | second housing wall |
| 85, 285, 485, 685 | third housing wall, in particular end shield |
| 87, 287, 487, 687 | first region |
| 89, 289, 489, 689 | second region |
| 91, 291, 491, 691, 891 | third region |
| 93, 293, 493, 693 | transmission housing |
| 95, 95$^I$, 295, 295$^I$, 495, 495$^I$, 695, 695$^{II}$ | extremity of a transmission housing |
| 97, 297, 497, 697 | first structural shell |
| 99, 299, 499, 699 | second structural shell |
| 101, 301, 501, 701 | third structural shell |
| 109, 309, 509, 709 | support point |
| 111, 311, 511, 711 | first bearing |
| 113, 313, 513, 713 | second bearing |
| 115, 315, 515, 715 | third bearing |
| 117, 317, 517, 717 | fourth bearing |
| 119, 319, 519, 719 | fifth bearing |
| 121, 321, 521, 721 | sixth bearing |
| 123, 323, 523, 723 | seventh bearing |
| 125, 325, 525, 725 | eighth bearing |
| 127, 327, 527, 727 | ninth bearing |
| 129, 329, 529, 729 | tenth bearing |
| 131, 331, 531, 731 | eleventh bearing |
| 133, 333, 533, 733 | twelfth bearing |
| 135, 335, 535, 735 | thirteenth bearing |
| 137, 337, 537, 737 | fourteenth bearing |

-continued

| Reference sign | Meaning |
| --- | --- |
| 139, 339, 539, 739 | fifteenth bearing |
| 141, 341, 541, 741, 941 | first synchronisation, in particular in the form of a cone synchronisation |
| 143, 343, 543, 743, 943 | second synchronisation, in particular in the form of a cone synchronisation |
| 145, 345, 545, 745 | third synchronisation, in particular in the form of a cone synchronisation |
| 147, 347, 547, 747 | fourth synchronisation, in particular in the form of a cone synchronisation |
| 149, 349, 549, 749 | bevel wheel |
| 151, 351, 551, 751 | transmission differential |
| 153, 353, 553, 753 | first wheel drive shaft |
| 155, 355, 555, 755 | second wheel drive shaft |
| 157, 357, 557, 757 | first movement direction |
| 159, 359, 559, 759 | second movement direction |
| 161, 361, 561, 761 | first rotation direction |
| 163, 363, 563, 763 | second rotation direction |
| 165, 365, 565, 765 | first region, in particular in the dual clutch transmission |
| 167, 367, 567, 767 | second region, in particular in the dual clutch transmission |
| 871, 871' | first step |
| 873, 873' | second step |
| 875, 875' | third step |
| 877, 877' | fourth step |
| 879 | fifth step |
| G1, G1$^I$, G1$^{II}$, G1$^{III}$ | first gear step |
| G2, G2$^I$, G2$^{II}$, G2$^{III}$ | second gear step |
| G3, G3$^I$, G3$^{II}$, G3$^{III}$ | third gear step |
| G4, G4$^I$, G4$^{II}$, G4$^{III}$ | fourth gear step |
| G5, G5$^I$, G5$^{II}$, G5$^{III}$ | fifth gear step |
| G6, G6$^I$, G6$^{II}$, G6$^{III}$ | sixth gear step |
| G7, G7$^I$, G7$^{II}$, G7$^{III}$ | seventh gear step |
| G8, G8$^I$, G8$^{II}$, G8$^{III}$ | eighth gear step |
| ZR1 | first gearwheel plane |
| ZR2 | second gearwheel plane |
| ZR3 | third gearwheel plane |
| ZR4 | fourth gearwheel plane |
| ZR5 | fifth gearwheel plane |
| ZR6 | sixth gearwheel plane |
| ZR7 | seventh gearwheel plane |

The invention claimed is:

1. A dual clutch transmission which is a gear-change transmission for a formation of eight gear steps over two countershafts, in which all gear steps of the dual clutch transmission are formed as forward gears, the dual clutch transmission comprising:
a dual clutch arrangement comprising two lamella clutch packs disposed on a central axis of the dual clutch transmission;
one or more drive input shafts, disposed on the central axis, on which a set of drive gearwheels of the gear steps are seated, the set of drive gearwheels comprising double meshing drive gearwheels and single meshing drive gearwheels;
a common output shaft, on which an output gear wheel is disposed;
two output fixed wheels, each output fixed wheel being disposed in a middle region of one of the two countershafts and being configured to transfer an output torque from one of the two countershafts to the common output shaft via the output gear wheel;
wherein both of the two output fixed wheels mesh with the same output gear wheel and there are the same numbers of double meshing drive gearwheels and single meshing drive gearwheels on each side of the output fixed wheels;
wherein each of the two countershafts comprises an outer diameter that tapers from a maximum outer diameter to a minimum outer diameter over a plurality of shaft steps, such that the maximum outer diameter of each countershaft is in the middle region of that countershaft and the minimum outer diameter of each countershaft is at each of the respective ends of that countershaft; and
wherein the common output shaft is connected to a spur wheel or bevel wheel which leads to a first end of a transmission differential, the first end of the transmission differential being located on a first plane that is parallel to and positioned between a second plane that passes through a bearing located at a first end of each of the two countershafts and a third plane that passes through a forward gear of each of the two countershafts.

2. The dual clutch transmission according to claim 1, wherein the one or more drive input shafts comprises a coaxial double shaft comprising an inner shaft and an outer shaft, wherein the inner shaft has fixed wheels as the drive gearwheels on a side facing away from the dual clutch arrangement.

3. The dual clutch transmission according to claim 2, wherein a translation step for a first gear comprises a fixed wheel on the inner shaft of the coaxial double shaft and a free wheel on one of the two countershafts, and a translation step for a second gear comprises a fixed wheel on the outer shaft of the coaxial double shaft and a free wheel on one of the two countershafts, wherein the fixed wheels for the first gear and for the second gear are drive wheels for the respective first and second gears.

4. The dual clutch transmission according to claim 2, wherein the one or more drive input shafts has a support point in a transition region between the inner shaft and the outer shaft, wherein two further support points for the dual clutch transmission are located in a region of extremities of a transmission housing.

5. The dual clutch transmission according to claim 1, wherein the countershafts and the one or more drive input shafts are supported alignedly in a middle region of the shafts through a separation plane, and are oriented on axes that are parallel to one another.

6. The dual clutch transmission according to claim 1, wherein:
the one or more drive input shafts comprises two different shafts, where one of the shafts is slotted into another of the shafts; and
at least two drive gearwheels, which are each disposed on a different shaft of the one or more drive input shafts, are drive gearwheels for a gear translation dual use.

7. The dual clutch transmission according to claim 1, wherein there are at least four single meshing drive gearwheels, of which a first two of the single meshing drive gearwheels are disposed on a first shaft of the one or more drive input shafts and a second two of the single meshing drive gearwheels are disposed on a second shaft of the one or more drive input shafts.

8. The dual clutch transmission according claim 1, wherein the common output shaft is solid, extends parallel to at least one of the countershafts, is shorter than the two countershafts and has two sets of bearings.

9. The dual clutch transmission according to claim 1, wherein the two countershafts and the one or more drive input shafts are supported respectively in three areas, wherein each shaft has a bearing of a first region in a first common structural shell, a bearing of a second region in a second common structural shell and a bearing of a third region in a third common structural shell.

10. The dual clutch transmission according to claim 1, wherein the dual clutch transmission has four cone synchronisations, each cone synchronisation being usable in two movement directions wherein, in each of the two movement directions, a free wheel is connectable in a form-fitting manner with one of the two countershafts.

11. The dual clutch transmission according to claim 1, wherein a first double meshing drive gearwheel is a drive gearwheel for two gears which are selected from a group of third gear, fifth gear and seventh gear, and a second double meshing drive gearwheel is a drive gearwheel for two gears which are selected from a group of fourth gear, sixth gear and eighth gear.

12. The dual clutch transmission according to claim 1, wherein the single meshing drive gearwheels are present as pairs, with each pair comprising two drive gearwheels that are directly adjacent to one another and that are fixed on the one or more drive input shafts, wherein each pair is connected at at least one side to a gearwheel step which comprises a double meshing drive gearwheel.

13. The dual clutch transmission according to claim 1, wherein each output fixed wheel is disposed directly adjacent to a middle bearing point on its respective countershaft, and wherein each countershaft is three, four or five stepped, in opposite directions, starting from the output fixed wheel such that a first side of each countershaft is a mirror image of a second side of the same countershaft, about the respective output fixed wheel.

14. A drive train of a motor vehicle which is a hybridised drive train with an internal combustion engine as a first drive machine and an electric motor as a second drive machine, wherein the internal combustion engine and the electric motor are uncoupleable from one another and both drive machines can develop a power flow through the same dual clutch arrangement, wherein the drive train comprises the dual clutch transmission according to claim 1.

* * * * *